United States Patent
Kowal et al.

(12) 
(10) Patent No.: US 10,405,204 B2
(45) Date of Patent: Sep. 3, 2019

(54) OPTIMIZING SPECTRAL EFFICIENCY IN A NETWORK BY ACTIVATING OR DEACTIVATING ACCESS POINTS BASED ON CLIENT DEVICE ACTIVITY

(71) Applicant: Cisco Technology, Inc., San Jose, CA (US)

(72) Inventors: Michael Alan Kowal, Summit, NJ (US); Stephen Michael Orr, Wallkill, NY (US); Robert Edgar Barton, Richmond (CA); Jerome Henry, Pittsboro, NC (US); Malcolm Muir Smith, Richardson, TX (US)

(73) Assignee: Cisco Technology, Inc., San Jose, CA (US)

( * ) Notice: Subject to any disclaimer, the term of this patent is extended or adjusted under 35 U.S.C. 154(b) by 4 days.

(21) Appl. No.: 15/581,213

(22) Filed: Apr. 28, 2017

(65) Prior Publication Data

US 2018/0242169 A1    Aug. 23, 2018

Related U.S. Application Data (60) Provisional application No. 62/460,368, filed on Feb. 17, 2017.

(51) Int. Cl.
*H04W 24/02*    (2009.01)
*H04W 28/02*    (2009.01)
(Continued)

(52) U.S. Cl.
CPC ....... *H04W 24/02* (2013.01); *H04W 28/0247* (2013.01); *H04W 28/08* (2013.01); *H04W 88/08* (2013.01)

(58) Field of Classification Search
CPC . H04W 24/02; H04W 28/08; H04W 72/0453; H04W 88/08; H04W 72/0473
See application file for complete search history.

(56) References Cited

U.S. PATENT DOCUMENTS

| | | | |
|---|---|---|---|
| 2006/0019679 A1* | 1/2006 | Rappaport | G01S 5/0252 455/456.5 |
| 2008/0104242 A1 | 5/2008 | Zavalkovsky et al. | |

(Continued)

OTHER PUBLICATIONS

Mehmet Umut Demircin, "Robust Video Streaming Over Time-Varying Wireless Networks", A Thesis Presented to the Academic Faculty, In Partial Fulfillment of the Requirements for the Degree Doctor of Philosophy in the School of Electrical and Computer Engineering, Georgia Institute of Technology, Aug. 2008, 119 pages.

(Continued)

*Primary Examiner* — Dady Chery
(74) *Attorney, Agent, or Firm* — Edell, Shapiro & Finnan, LLC (57) ABSTRACT

Presented herein are techniques for optimizing spectral efficiency in a network. One or more metrics of one or more wireless access points that enable one or more wireless client devices to connect to a wireless network are monitored. The one or more metrics reflect a level of client device activity. Based on the one or more metrics, the level of client device activity is determined to require a change in a number of the one or more wireless access points that are active to serve the one or more wireless client devices. The one or more wireless access points are activated or deactivated to improve a spectral efficiency of the wireless network.

20 Claims, 8 Drawing Sheets

(51) Int. Cl.
*H04W 88/08* (2009.01)
*H04W 28/08* (2009.01)

(56) References Cited

U.S. PATENT DOCUMENTS

| | | | |
|---|---|---|---|
| 2014/0171069 A1 | 6/2014 | Pang et al. | |
| 2016/0007278 A1* | 1/2016 | Gupta | H04W 76/10 370/329 |
| 2016/0029407 A1 | 1/2016 | Soldati et al. | |
| 2017/0238188 A1* | 8/2017 | Youtz | H04W 16/14 455/454 |

OTHER PUBLICATIONS

A. Jardosh, et al., "Green WLANs: On-Demand WLAN Infrastructures", Dec. 9, 2008, DOI 10.1007/s11036-008-0123-8, Mobile Netw Appl (2009) 14:798-814, 17 pages.

C. Lukaszewski, et al., "Empirical Measurement of Channel Degradation Under Load", Aruba Networks, Mar. 2015, doc.: IEEE 802.11-15/0351r2, 24 pages.

Amit Pulin Jardosh, "Adaptive Large-scale Wireless Networks: Measurements, Protocol Designs, and Simulation Studies", University of California, Santa Barbara, A Dissertation submitted in partial satisfaction of the requirements for the degree of Doctor of Philosophy in Computer Science, Mar. 2008, UMI No. 3297631, pp. 1-100.

Amit Pulin Jardosh, "Adaptive Large-scale Wireless Networks: Measurements, Protocol Designs, and Simulation Studies", University of California, Santa Barbara, A Dissertation submitted in partial satisfaction of the requirements for the degree of Doctor of Philosophy in Computer Science, Mar. 2008, UMI No. 3297631, pp. 101-200.

Amit Pulin Jardosh, "Adaptive Large-scale Wireless Networks: Measurements, Protocol Designs, and Simulation Studies", University of California, Santa Barbara, A Dissertation submitted in partial satisfaction of the requirements for the degree of Doctor of Philosophy in Computer Science, Mar. 2008, UMI No. 3297631, pp. 201-300.

Amit Pulin Jardosh, "Adaptive Large-scale Wireless Networks: Measurements, Protocol Designs, and Simulation Studies", University of California, Santa Barbara, A Dissertation submitted in partial satisfaction of the requirements for the degree of Doctor of Philosophy in Computer Science, Mar. 2008, UMI No. 3297631, pp. 301-336.

* cited by examiner

```
                                          ┌──────────────────────────────────┐
                                          │ MONITORING ONE OR MORE METRICS   │  710
                                   700    │ OF ONE OR MORE WIRELESS ACCESS   │
                                          │ POINTS THAT ENABLE ONE OR MORE   │
                                          │ WIRELESS CLIENT DEVICES TO       │
                                          │ CONNECT TO A WIRELESS NETWORK,   │
                                          │ WHEREIN THE ONE OR MORE METRICS  │
                                          │ REFLECT A LEVEL OF CLIENT        │
                                          │ DEVICE ACTIVITY                  │
                                          └──────────────────────────────────┘
                                                          │
                                                          ▼
                                          ┌──────────────────────────────────┐
                                          │ BASED ON THE ONE OR MORE METRICS,│  720
                                          │ DETERMINING THAT THE LEVEL OF    │
                                          │ CLIENT DEVICE ACTIVITY REQUIRES  │
                                          │ A CHANGE IN A NUMBER OF THE ONE  │
                                          │ OR MORE WIRELESS ACCESS POINTS   │
                                          │ THAT ARE ACTIVE TO SERVE THE ONE │
                                          │ OR MORE WIRELESS CLIENT DEVICES  │
                                          └──────────────────────────────────┘
                                                          │
                                                          ▼
                                          ┌──────────────────────────────────┐
                                          │ ACTIVATING OR DEACTIVATING THE   │  730
                                          │ ONE OR MORE WIRELESS ACCESS      │
                                          │ POINTS TO IMPROVE A SPECTRAL     │
                                          │ EFFICIENCY OF THE WIRELESS       │
                                          │ NETWORK                          │
                                          └──────────────────────────────────┘
```

FIG. 7

FIG.8

OPTIMIZING SPECTRAL EFFICIENCY IN A NETWORK BY ACTIVATING OR DEACTIVATING ACCESS POINTS BASED ON CLIENT DEVICE ACTIVITY

CROSS REFERENCE TO RELATED APPLICATION

This application claims priority to U.S. Provisional Application No. 62/460,368, filed Feb. 17, 2017. The entirety of this application is incorporated herein by reference.

TECHNICAL FIELD

The present disclosure relates to configuring access points based on client device activity.

BACKGROUND

The number of network-connected mobile devices is rapidly increasing. This can be attributed to a number of factors including generational shifts, the rise of the shared economy (e.g., peer-to-peer transactions), information technology consumerization, bring-your-own-device policies, and the evolution of the mobile workforce. A consequence of this is that new challenges are presented in terms of how to serve wireless connectivity in rapidly changing environments.

DESCRIPTION OF EXAMPLE EMBODIMENTS

Overview

Presented herein are techniques for optimizing spectral efficiency in a wireless local area network. One or more metrics of one or more wireless access points that enable one or more wireless client devices to connect to a wireless network are monitored. The one or more metrics reflect a level of client device activity. Based on the one or more metrics, the level of client device activity is determined to require a change in a number of the one or more wireless access points that are active to serve the one or more wireless client devices. The one or more wireless access points are activated or deactivated to improve a spectral efficiency of the wireless network.

DETAILED DESCRIPTION

Due in part to the ever-increasing number of network-connected mobile devices, Wi-Fi®-enabled wireless networks areas often experience so-called "flash crowds," in which a large number of clients in a wireless network-enabled area suddenly attempt to use wireless local area network (WLAN) services. These crowds may attempt to use WLAN services for a known or unknown length of time before moving to a different location. Flash crowds may occur, for example, in classrooms, conference halls, sport stadiums, and other locations and situations. For example, at a conference hall hosting a conference, the arrival and departure of large numbers of attendees attempting to use WLAN services is random. Optimized WLAN coverage in this situation is technically difficult and often expensive, requiring many wireless access points (APs) in the conference hall that are unnecessary when the conference is not taking place. Also, deploying a high density of APs in a highly populated area reduces the maximum performance of all client devices that are present due to smaller (e.g., 20 MHz) bandwidth channels (even if there are only a few active client devices). Further, an AP service set identifier (SSID) uses approximately 3% of airtime just to broadcast its availability, which may be wasteful if there are large numbers of SSIDs and APs that are active but not being used by a client. On the other hand, while a small number of APs with larger channel sizes may provide greater overall throughput when a small number of client devices are present, the client devices suffer greatly from contention issues when demand increases, thus negatively impacting overall WLAN performance. In addition, current WLAN optimization techniques do not use appropriate objective functions for optimizing user experience. As such, presented herein are cost-effective, efficient, and practical techniques to support flash crowds and other similar scenarios.

IEEE 802.11 Media Access Control (MAC) spectral efficiency is inversely proportional to the number of stations (clients) contending for the medium. When subdividing wider 802.11 channels into narrower channels on a greater number of APs, thus increasing the number of contention/collision domains during periods of dense client association, better WLAN performance may be achieved (e.g., by balancing any loss in trunking efficiency with improvements in co-channel signal-to-noise-plus-interference ratios (SNIR)). For example, a 160 MHz channel can offer higher performance to a limited number of client devices, but when WLAN contention increases with client device load, utilization and per-client performance degrades. However, when the same number of client devices are allocated over two 80 MHz channels, contention per channel is reduced, overall spectral efficiency increases, and user performance improves.

A physical location with the potential for increased WLAN demand is thus deployed with more APs than would be necessary under minimal conditions for Radio Frequency (RF) footprint coverage (the spatial distribution and maximum number (or density) of APs deployed in a location corresponds to a maximum number of non-overlapping channels). One or more controllers (e.g., wireless/WLAN controllers) communicate with a group of APs in a single location/site that may experience flash crowds. This group of APs is referred to as a "demand response group".

As further described below, the controller may holistically view the demand response group. The controller may be aware of the number of APs in the demand response group and may continually analyze the performance metrics and thresholds in light of this number. Thus, the controller may have a holistic view of spectral use in a geographical area corresponding to one or more demand response groups. Solutions may also be used to track/measure metrics other than via the APs themselves. For example, a real-time location system may be used to count the total number of wireless devices in a single area (e.g., APs/clients).

Figure 1:
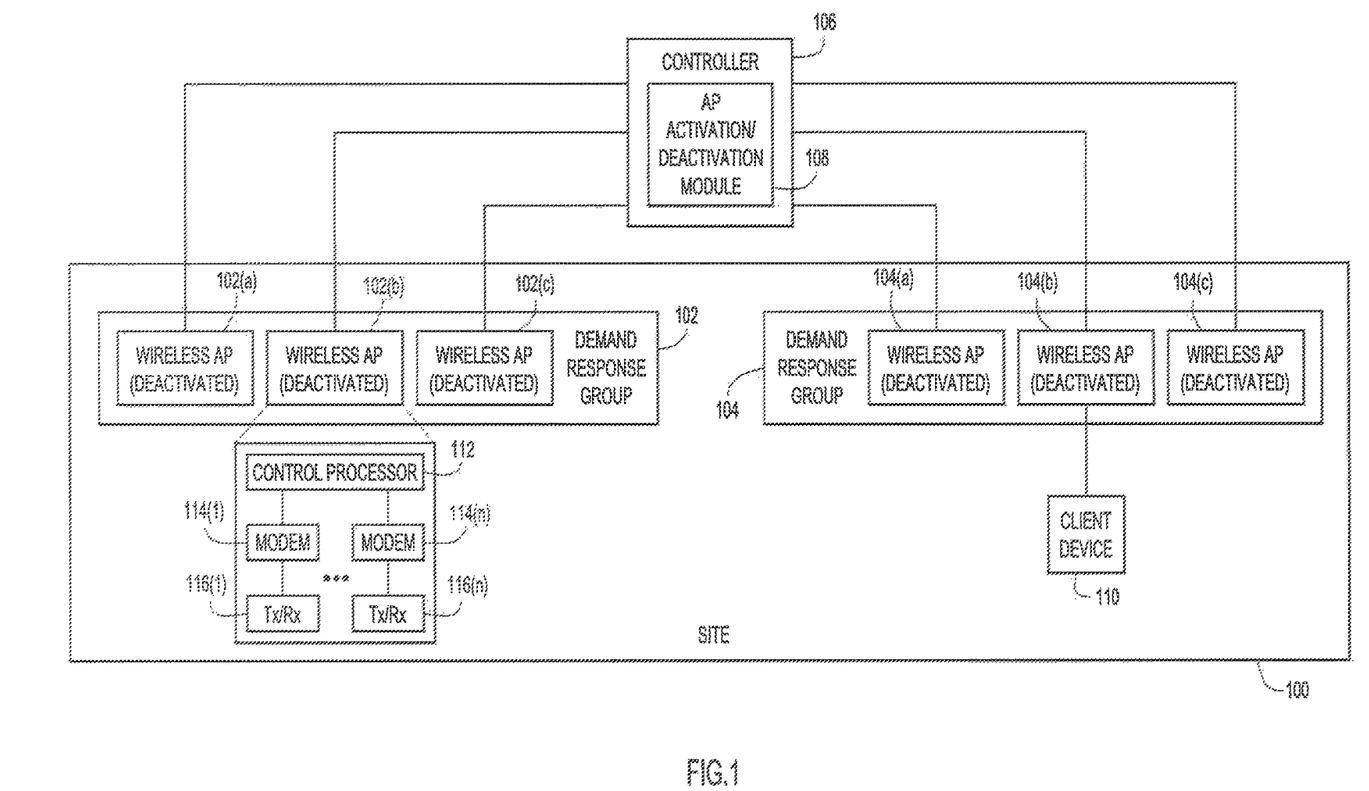
FIG. 1 is a block diagram illustrating a site at which a wireless network is deployed that includes a plurality of wireless access points controlled by a controller configured to activate or deactivate one or more access points in response to a change in client activity, according to an example embodiment.

FIG. 1 illustrates a site 100 that includes demand response group 102 and demand response group 104. The demand response groups 102, 104 include respective wireless APs 102a-c, 104a-c which are controlled by wireless network controller 106. Controller 106 includes an AP activation/deactivation module 108 to control the activation and/or deactivation of wireless APs 102a-c, 104a-c. As shown illustratively with respect to wireless AP 102(b), each wireless AP 102a-c, 104a-c includes a control processor 112, one or more modems 114(1)-(n), and corresponding one or more transceivers 116(1)-(n). The number of modem/transceiver pairs determines the number of radio channels/frequencies of traffic that the AP can support. Each AP supports at least one radio channel of traffic and thus has at least one modem and one transceiver. However, in general, one or more of the APs may have multi-channel capability and thus have multiple pairs of modems/transceivers, as depicted in the example of FIG. 1 for AP 102(b).

Site 100 is a conference hall, and demand response groups 102, 104 are located in respective conference rooms that regularly host meetings. At the present time, there are no ongoing meetings in either conference room. As such, there is no client demand in the conference room that includes demand response group 102, and demand from only one client device 110 in the conference room is for a client that is associated to an AP demand response group 104 (client device 110 may correspond to, for example, a single unscheduled user of the conference room). Because there is no client demand in the conference room that includes demand response group 102, the controller 106 has deactivated wireless APs 102a-c. The controller 106 has similarly deactivated wireless APs 104a,c, but has activated wireless AP 104b to accommodate client device 110. Thus, under normal conditions (e.g., when there is not a flash crowd), only a fraction of wireless APs in a demand response group is necessary to accommodate the client demand. In this case, the controller 106 may activate a minimum number of wireless APs to provide RF coverage to the location with the best possible performance. For example, the controller 106 provides coverage to client device 110 by activating only wireless AP 104b with a relatively wide (e.g., 160 MHz) channel.

In an example, one or more of the APs 102a-c, 104a-c may include multichannel capability to support traffic on multiple frequencies/channels simultaneously. For example, at least one AP (e.g., AP 102(b)) includes a plurality of radio transceivers 116(1)-(n) and a corresponding plurality of modems 114(1)-(n), configured to operate over a respective one of a plurality of radio channel(s). Controller 106 monitors one or more metrics associated with traffic supported by the plurality of radio transceivers 116(1)-(n) and corresponding modems 114(1)-114(n) for each of a plurality of radio channels. The metrics associated with traffic supported by the plurality of radio transceivers 116(1)-(n) and corresponding plurality of modems 114(1)-114(n) may be similar to the metrics associated with traffic associated with a single radio channel. The metrics are described in greater detail below. The one or more metrics of the plurality of radio transceivers 116(1)-(n) may indicate a level of client device activity being handled by each of the plurality of radio transceivers 116(1)-(n) (and corresponding plurality of modems 114(1)-(n)). Based on the level of client device activity observed for each of the plurality of radio transceivers 116(1)-(n) of a given AP (e.g., wireless AP 102(b)), the controller 106 may determine that the level of client activity requires/necessitates a change in a number of the plurality of radio transceivers 116(1)-(n) that are active to serve the one or more wireless client devices (e.g., client device 110). As described in greater detail below, the controller 106 may activate or deactivate one or more of the plurality of radio transceivers 116(1)-(n) of at least one of the one or more APs 102a-c, 104a-c to improve the spectral efficiency of the wireless network. Thus, it is to be understood that the activation/deactivation of a given AP may be made for select one or more of a plurality of radio transceivers/modems of a given AP that has multi-channel capability, or for a single radio transceiver/modem of an AP that has supports a single channel.

Figure 2:
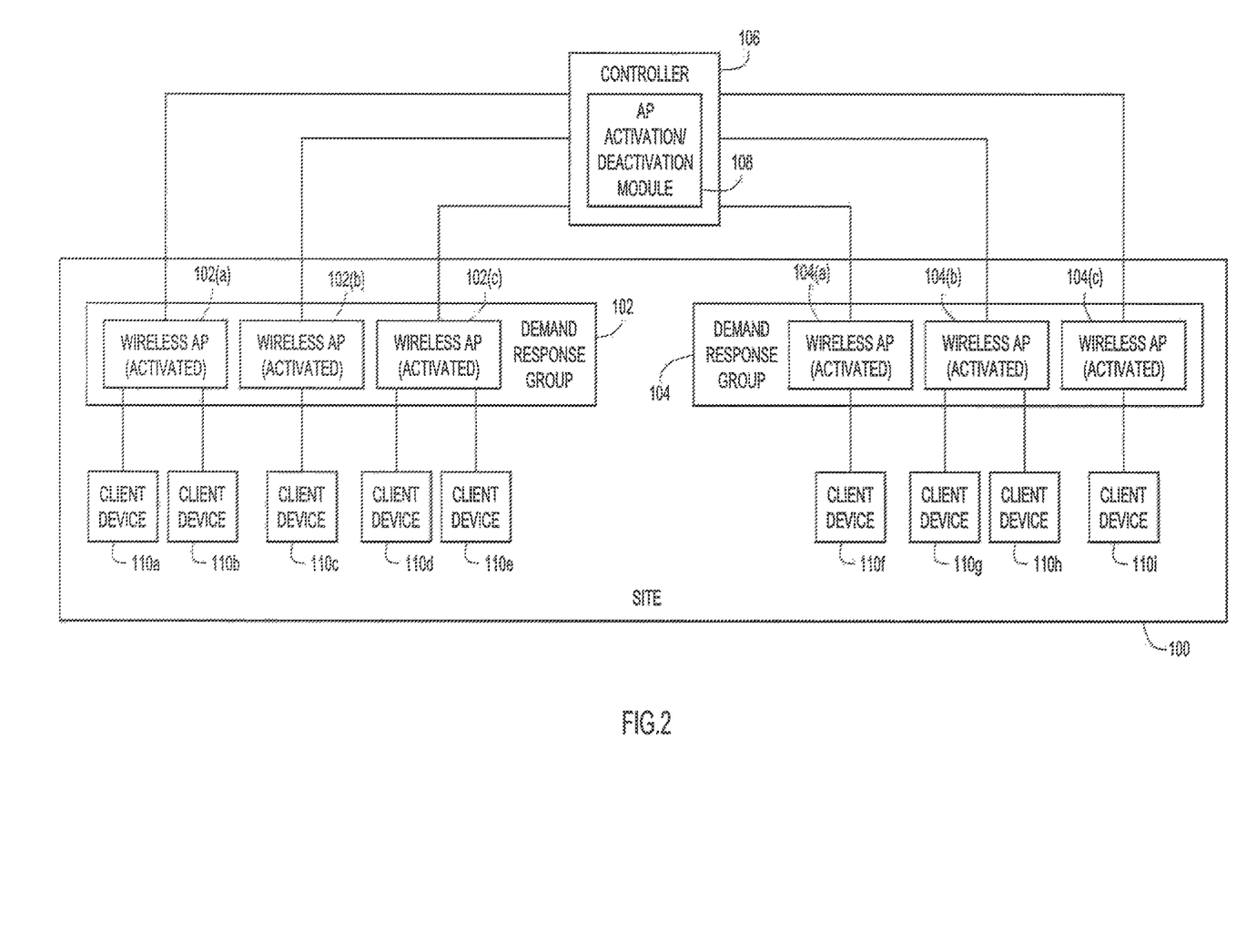
FIG. 2 is a block diagram illustrating the site of FIG. 1, but at a different instant of time at which the controller has activated multiple access points in response to an increase in client demand, in accordance with an example embodiment.

Turning now to FIG. 2, shown is the site 100 at a later instant of time. At this instant, both conference rooms are hosting respective meetings. Due to the flash crowd caused by the sudden influx of meeting attendees, demand from client devices has increased significantly. In response, the controller 106 determines that more wireless APs in demand response groups 102, 104 need to be configured to maintain a high spectral efficiency. In particular, the controller 106 activates (e.g., "wakes up") wireless APs 102a-c, 104a, and 104c while dynamically reducing channel widths of some or all of the APs 102a-c, 104a-c. For example, the controller 106 may subdivide the 160 MHz channel of wireless AP 104b into one 40 MHz-channel AP (wireless AP 104a), one 80 MHz-channel AP (wireless AP 104b), and another 40 MHz-channel AP (wireless AP 104c). As explained in greater detail below, the controller 106 may intelligently steer/assign client devices 110a-e to the optimal AP among APs 102a-c in demand response group 102, and client devices 110f-i to the optimal AP among APs 104a-c in demand response group 104. For example, the controller 106 may assign client device 110i to wireless AP 104c because client device 110i is a legacy device that is only capable of operating in 40 MHz channels or below.

As client demand is reduced (e.g., the meetings end and the meeting attendees exit site 100), the controller 106 may deactivate some or all of APs 102a-c, 104a-c and/or adjust their channel widths (e.g., by increasing the channel widths of the remaining activated APs). It should be appreciated that site 100 may be any suitable geographical area/location (e.g., conference hall, mall, school, office building, etc.).

APs in a demand response group (i.e., the group of APs in a given coverage area) may be activated (e.g., "turned on") or deactivated (e.g., "turned off") based on a measured client demand. It should be appreciated that there may be any number of demand response groups. APs, and client devices. In addition, APs/demand response groups may be organized based on any logical arrangement (e.g., APs may be statically or dynamically arranged into demand response groups based on location, physical rooms, measured client density variations, etc.). Further, in certain situations, only a portion of the APs in a demand response group may be activated in response to a flash crowd.

The controller 106 may activate/deactivate APs in a demand response group based on a measured client demand (e.g., by measuring cell spectral efficiency). Spectral efficiency may be computed by the controller 106 based on metrics/key performance indicators including: channel utilization (e.g., reception/transmission from an AP of interest, co-channel channel utilization, available transmission opportunity (TXOP) etc.); SNIR distribution (e.g., uplink/downlink); and client load (e.g., client count, traffic type and volume, client capabilities, etc.). The channel utilization may indicate channel fullness (i.e., available TXOP) and interference (co-channel channel utilization, which equals channel utilization minus reception minus transmission). SNIR may indicate interference (e.g., co-channel interference, adjacent channel interference, non-Wi-Fi interference, etc.) as well as the spatial distribution of clients. Client count/load, which may be determined by transmission opportunities taken, may indicate spectral efficiency (e.g., too many transmission opportunities taken for a given access category may cause exponential delay/loss). In addition, traffic type and volume may indicate airtime requirements. For example, a majority of voice flows may indicate the need for smaller channel width, with more available radios to increase the airtime (hence reducing contention and loss). Client capability may determine the optimal channel width. As such, an objective may be to choose a cell size/frequency reuse (user density/AP) that maximizes the SNIR (e.g., having the lowest co-channel interference and the best quality) while minimizing the channel utilization (e.g., having the highest capacity and highest spectral efficiency) that may be achieved by activating/deactivating APs.

In an example, the controller 106 may determine that performance has degraded by comparing the metrics to a predetermined threshold. As explained in greater detail below, in a further example, once the threshold is met, the controller 106 activates more APs while subdividing larger channels of originally active APs to create a greater number of (but smaller) channels (e.g., contention/collision domains). The threshold for spectral efficiency may be a measurement based on channel utilization (e.g., percentage of air time consumed by AP transmissions compared to the total available air time) and total client association.

Average or cell-wide efficiency metrics alone may not be enough to trigger increased AP coverage. For example, a single client may be able to reach the maximum throughput of an AP without having to contend with other clients. It has also been shown that a large number of clients decreases efficiency even if maximum theoretical throughput has not been reached. Furthermore, not all clients are capable of wider channel sizes (e.g., certain legacy clients may only be capable of operating in 20 MHz channels).

The controller 106 may directly or indirectly measure a level of client activity by active (or inactive) APs (e.g., via the metrics), or by other techniques (e.g., cameras that capture views of a coverage area, estimated client demand, statistics corresponding to previous demand, etc.). Thus, the level of client activity may be determined based on past occurrences/statistics/etc. and/or current metrics/measurements/etc. In an example, the metrics may be estimated via predictive modelling using simple inputs. For instance, SNIR and channel utilization may be estimated solely from AP density (which may be known a priori) and user density (which may be measured outside the Wi-Fi domain (e.g., global positioning system (GPS) data) or inside the Wi-Fi domain (e.g., received signal strength indication (RSSI) or angle-of-arrival (AoA) based location determination). In another example, SNIR and channel utilization may be estimated from historical data of the same or similar venues at the same or similar times (e.g., time-of-day, time-of-month, etc.) The controller 106 may also directly obtain the spectral efficiency metrics based on active monitoring (e.g., actual crowd density measurements). These metrics may be obtained by monitoring active APs or via any other density estimation method. In addition, the controller 106 may increase or decrease infrastructure radio capacity in proportion to the local and/or overall client demand such that global RF and throughput performances are optimized. This may in turn influences the number of collision/contention domains.

In an example, an intelligent system may be coupled with security cameras in a stadium that feed an attendee count to a controller. Observation of previous densities may be used to proactively estimate the current density of the stadium. For instance, if the system is operating on a Saturday night, APs may begin activating additional APs and shrinking cells at 5:45 pm, and steadily continue until 6:30 pm, which is when the average maximum Saturday night crowd density is achieved. Crowd density may also be programmed directly into a system (e.g., without directly observing a crowd or taking into account past crowds). For instance, if a conference is scheduled for 3:00 pm and five hundred people registered, APs may be activated accordingly (e.g., beginning at 2:30 pm, when the crowd is expected to begin to arrive). Thus, the controller may take into account spectral efficiency metrics (e.g., channel utilization, presence of voice clients, etc.) to determine whether to dynamically adjust (e.g., slow down, speed up, stop, etc.) the number of activated/deactivated APs in a demand response group.

Any number of metrics may be used to optimize spectral efficiency. For example, a combination of metrics may be analyzed to determine a level of client activity. Controller 106 may determine an optimal combination of channel size, transmit power, receiver start-of-packet (RX-SOP) threshold (explained in greater detail below), radio count, etc. based on user density/the determined level of client activity.

By dynamically increasing or decreasing radio/AP capacity during times of fluctuating demand, overall WLAN performance may be improved through the manipulation of the number of collision/contention domains. By measuring total client activity, radio capacity may be increased or decreased based on the current demand level. The demand response groups 102, 104 allow the controller 106 to monitor the RF neighborhood/environment/site 100 from a holistic perspective and influence radio management. Radio management may be based not only on the active APs that are currently providing RF coverage, but also the total possible radio capacity, including radios that are asleep during times of low demand. Thus, the controller 106 dynamically adds or removes radios/APs from the neighborhood/location/site 100. In other words, the controller 106 adds or removes infrastructure radio capacity in an on-demand manner.

In response to a change in client demand (measured via the spectral efficiency metrics, cameras, timers, etc.), the controller 106 may activate/deactivate APs, modify channel width, AP power, and/or RX-SOP threshold, and/or adjust other optimization parameters. For instance, the controller 106 may adjust AP channel widths so as to minimize co-channel interference and/or based on the type/quantity of clients. The controller 106 may also take additional optimization actions in parallel, for example, by dynamically load-balancing clients across APs, reducing the RX-SOP threshold of each AP to reduce overlapping Basic Service Set (BSS) contention, reducing each AP radio power level, etc. The controller 106 may use these techniques dynamically, and need not use them at the same time. Further, different thresholds may be used to activate each individual optimization function in combination with the other functions.

The exact number of active APs and optimal channel widths for a given demand response group may depend on the quantity and type of associated clients. As time progresses, the controller 106 may continue to monitor metrics on all active APs in the demand response groups 102, 104. As client demand continues to increase, the threshold may be reached and more APs enabled in the demand response groups 102, 104. When this occurs, AP channel sizes may be reduced and the controller 106 may steer/load-balance clients to the newly activated APs. As demand continues to increase, this may be repeated until eventually the maximum number of APs (i.e., each AP in the demand response groups 102, 104) is activated (e.g., each having a minimum channel width such as 20 MHz). As such, in addition to activating/deactivating APs, the controller 106 may also increase spectral efficiency via channel width change, AP transmit power change, etc.

This also works in reverse: as the metrics fall below a threshold(s), the number of APs may be reduced and the channel size increased (thus improving performance for the smaller number of clients). In concert with selection of channel bandwidth, the appropriate RX-SOP threshold and transmit power (TXP) are also selected to maintain a compatible cell size and/or reduce a co-channel interference. Every receiver has the ability to have a setting which determines a threshold for energy on a channel. If the energy is above the threshold, the receiver decodes the packet; if the energy is below the threshold, the receiver does not. This is called the Start of Packet (SOP) threshold.

RX-SOP threshold is a feature meant for dense deployments, where channel reuse is a concern. It is a way to effectively shrink cell sizes. RX-SOP threshold can be thought of as a way to put "ear muffs" on an AP. For example, channel spectral efficiency decreases as the cell edge increases due to propagation gain (e.g., a flash crowd moves, causing less path loss). In this example, RX-SOP threshold may be increased (e.g., from −65 dBm to −70 dBm) to serve clients in a new larger cell, and the transmitter power range may or may not be increased to minimize co-channel interference. As such, RX-SOP threshold may be used in conjunction with other mechanisms to dynamically adjust cell size and other characteristics.

The controller 106 may increase or lower radio/AP capacity based on comparisons of measured spectral efficiency (obtained via the spectral efficiency metrics) and thresholds of spectral efficiency including current and potential SNIRs and MAC efficiency distributions. These thresholds may be based on actual client traffic rather than mere capabilities. When the controller 106 adds or removes radios/APs, the controller 106 may use radio resource management tools to optimize the new radio environment. The controller 106 may also use dynamic bandwidth selection to adjust the sizes of the new channels for a specific client (e.g., to support a lower bandwidth). The controller 106 may also use dynamic channel assignment and dynamic frequency selection to optimize spectral efficiency.

In brief summary, the controller 106 may monitor spectral efficiency based on certain metrics. If the spectral efficiency matches/exceeds a threshold value, the controller 106 may increase radio capacity by activating additional APs and/or adjusting other optimization parameters. If the spectral efficiency falls below the threshold value, radio capacity may be decreased by deactivating additional APs, and radio resource management may provide wider channels having a higher per-client throughput. Other optimization mechanisms (e.g., RX-SOP threshold change, radio power increase, etc.) may also be applied.

Figure 3:
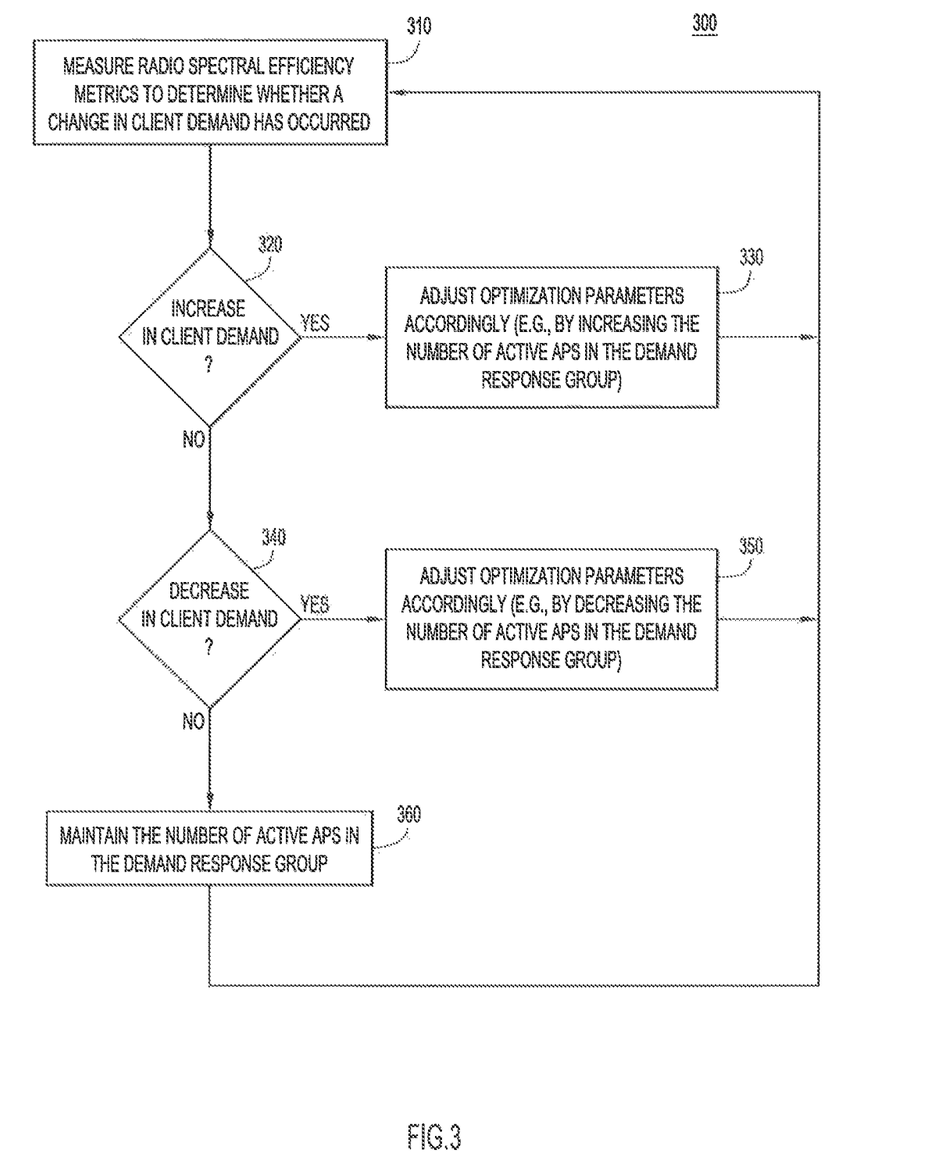
FIG. 3 is a flowchart of a method for activating or deactivating access points based on client activity in accordance with an example embodiment.

FIG. 3 illustrates a flowchart of a method 300 for optimizing a number of active APs in a demand response group. At 310, radio spectral efficiency metrics are measured to determine whether a change in client demand has occurred. As explained above, these metrics may include channel utilization, SNIR distribution, associated client count, load, etc. At 320, it is determined whether the client demand has increased. As explained above, the controller may make a determination as to the change in client demand by comparing the measured radio spectral efficiency metrics to a threshold value(s). If so (i.e., "Yes" at 320), the controller adjusts the optimization parameters accordingly (e.g., by increasing the number of active APs in the demand response group) at 330. As explained above, adjusting optimization parameters may involve activating/deactivating APs, modifying channel width, AP power, and/or RX-SOP, etc. The flow then returns to 310, where radio spectral efficiency metrics continue to be measured. If client demand has not increased (i.e., "No" at 320), it is determined whether, based on the measurement of the metrics, the client demand has decreased at 340. If so (i.e., "Yes" at 340), the controller adjusts the optimization parameters accordingly (e.g., by decreasing the number of active APs in the demand response group) at 350. The flow then returns to 312, where radio spectral efficiency metrics continue to be measured. If client demand has not decreased (i.e., "No" at 340), the number of active APs in the demand response group is maintained/unchanged at block 360. The flow then returns to 310, where radio spectral efficiency metrics continue to be measured.

In an example, a large university classroom deploys Z total number of APs, and X active APs. This classroom may host over five hundred students during peak times. When the classroom is occupied by only a handful of students, only a small number of APs are required for minimal coverage (i.e., X<Z). Radio resource management, dynamic channel assignment, and dynamic bandwidth selection may be used to optimize coverage and provide the widest possible channels for the small number of clients. When a large number of students suddenly enter the classroom (e.g., for a class), contention increases and spectral efficiency decreases. Traditional radio resource management may not improve adequate coverage, and dynamic channel assignment and transmit power control may already be optimized based on the current channel plan. Dynamic bandwidth selection may be of limited influence when voice clients are detected but effective spectral efficiency cannot be factored. At this point, thresholds for the metrics (e.g., channel utilization, SNIR, client activity, etc.) are crossed. The controller now incrementally activates sleeping APs to meet the increased demand. Optionally, the controller may also improve spectral efficiency by reducing the channel bandwidth on selected APs. This continues until all APs are active (i.e., X=Z). Radio resource management (e.g., including RX-SOP), dynamic channel assignment, and dynamic bandwidth selection may continue to optimize the RF environment based on the added (newly activated) radios/APs. The controller may maintain operational spectral efficiency by decreasing or increasing the operating bandwidth as APs are activated or deactivated. When the students suddenly leave the classroom (e.g., when class ends), the same process is performed in reverse, until only the minimum number of APs are active again. Thus, as illustrated in this example, the controller monitors metrics (e.g., client counts, channel utilization, etc.) to determine whether to activate or deactivate APs in the demand response group to dynamically increase or decrease radio capacity based on client demand.

When woken up, new APs join the RF environment. If the demand then increases, radio resource management/dynamic channel assignment/dynamic bandwidth selection/dynamic frequency selection/RX-SOP threshold adaptation may optimize the new channel plan based on added radios and high density constraints (based on current client activity). For example, dynamic channel bandwidth selection may be used to change the bandwidth based on client demand (e.g., number of clients entering or exiting an area, change in client traffic characteristics such as a client starting a call, requiring a higher-quality link, etc.). If client demand subsequently increases but X is less than Z, the controller may wake up even more APs until X equals Z. If client demand decreases, based on the channel utilization thresholds and client metrics, the controller incrementally shuts down/deactivates APs. As demand continues to fall, the number of active APs is reduced to the minimum number of APs to accommodate RF coverage.

In an example, APs in a demand response group are activated with certain bandwidth constraints/set optimization parameters (e.g., 40 or 80 MHz but not 160 MHz), transmission power and/or transmission control power limits (e.g., greater than 10 and greater than 5, respectively) and receiver start of packet bounds (e.g., 70 dBm). The controller may determine how to optimize these APs by determining, for instance, the optimal frequency-reuse-factor and associated bandwidth that maximizes MAC efficiency (for a given number of users per cell). The plots in FIGS. 4 and 5 may help make this determination under the consideration of trunking efficiency (e.g., the consideration that splitting a cell into three smaller cells results in a potential per-AP imbalance that affects efficiency). Possible RX-SOP threshold options are iterated for each transmit power (TXP) (e.g., as shown in FIG. 6) to determine the most appropriate transmit power control and/or Rx-SOP bounds given a cell size. The cell size may be selected based on the choice of frequency-reuse-factor and/or bandwidth.

Figure 4:
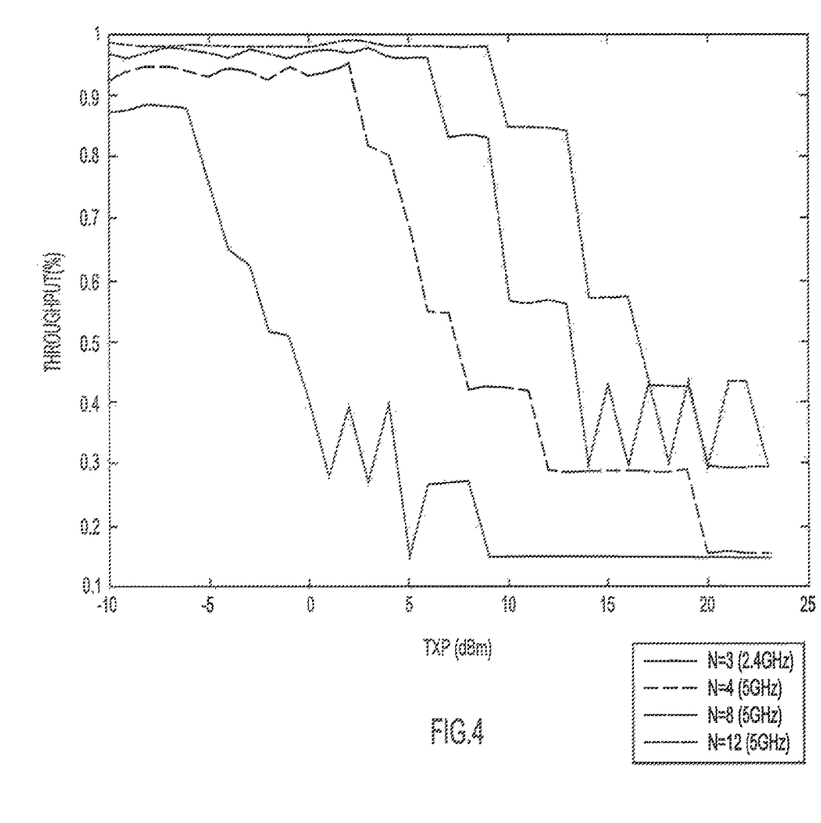
FIG. 4 is a plot showing efficiency versus frequency reuse in accordance with examples provided herein.

More specifically, FIG. 4 shows sample numbers of available channels (N) for several APs positioned in the same area/location. As the power (x-axis) increases, the efficiency of the throughput (y-axis) degrades faster with fewer available channels. For example, the efficiency of the throughput N=3 degrades faster than if N=12. This is because the APs interfere with each other if they use the same channels. In other words, FIG. 4 shows an estimation of the maximum channel utilization of a single cell (e.g., an AP serving its own clients) versus common Wi-Fi channel reuse options (N) and AP transmit power. For example, if N=8 non-overlapping channels are available for allocations to APs and the AP has a transmit power of 10 dBm, the estimated max channel utilization (throughput) is approximately 55%. This example plot may be used to determine when APs should be activated/deactivated (and when channel width/the number of available channels should be adjusted).

Figure 5:
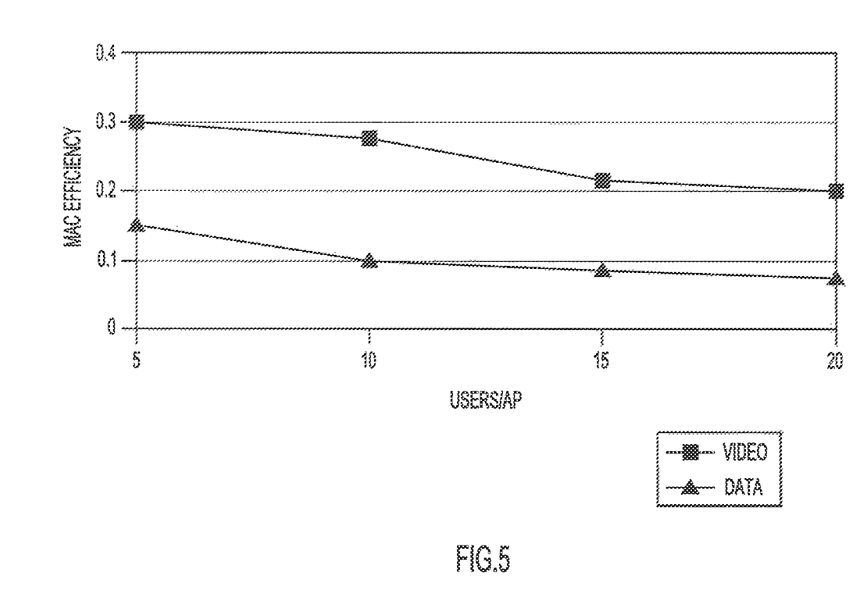
FIG. 5 is a plot showing Media Access Control (MAC) efficiency versus simultaneous users for different access categories, in accordance with examples provided herein.
Figure 6:
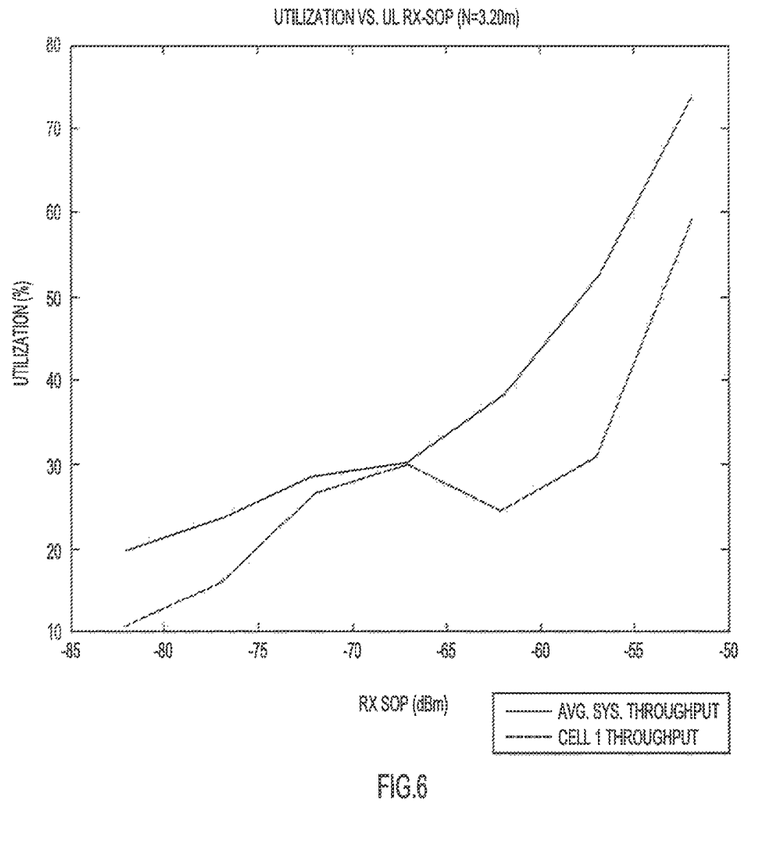
FIG. 6 is a plot showing possible receiver start-of-packet threshold options for an average access point as well as for a particular access point, in accordance with examples presented herein.

FIG. 5 illustrates a plot of an estimate of MAC spectral efficiency as a function of the number of users per AP/cell for common traffic classes (i.e., video and data). For example, when 10 simultaneous video and data users are served by the AP, the total MAC efficiency is 0.2+0.1=0.3 or 30%, which means 70% of the actual transmission or air-time is wasted as overhead.

FIG. 6 illustrates another scenario involving neighboring/overlapping cells. In this example, N represents the cell radius. This plot shows that when the RX-SOP threshold is set to a relatively low number, thereby effectively reducing the radius in which the AP can detect a client, the spectral efficiency increases. This is because the AP ignores signals from other stations in neighboring cells. In other words, FIG. 6 shows the maximum possible channel utilization of a cell (e.g., an AP serving its own clients) as a function of the RX-SOP threshold. For example, if the RX-SOP threshold is −50 dBm (i.e., a smaller cell), the maximum channel utilization is approximately 70%. As such, very little air time is wasted. By contrast, for an RX-SOP value of −70 dBm (i.e., a larger cell) the maximum channel utilization is approximately 30% in the presence of active neighboring cells, corresponding to an excess of wasted air time.

"On-Demand Licensing" mechanisms may also be employed. AP licenses may be dynamically borrowed and returned from a global pool (e.g., in the controller) to optimize license use where needed/requested. APs are sold both as hardware devices as well as licenses on the software of the controller that controls the APs. This allows AP licenses to be borrowed from a larger pool in the controller, thereby reducing the cost impact of purchasing an excess of APs for flash crowd-probable areas. For example, as demand increases in a given location, the controller activates more APs, which requires borrowing AP licenses. As demand decreases, the extra APs are deactivated and the licenses are returned to the global pool. This permits AP licenses to be dynamically assigned to any demand response group/APs in the overall network where demand is higher at a given time. For example, this mechanism may be useful for conference rooms that fill to near-capacity while neighboring rooms have low attendance or are empty. In another example, this mechanism may be useful for students (e.g., in a high school) moving en masse in corridors between classes while other nearby areas (e.g., outside/recess areas) are empty.

Figure 7:
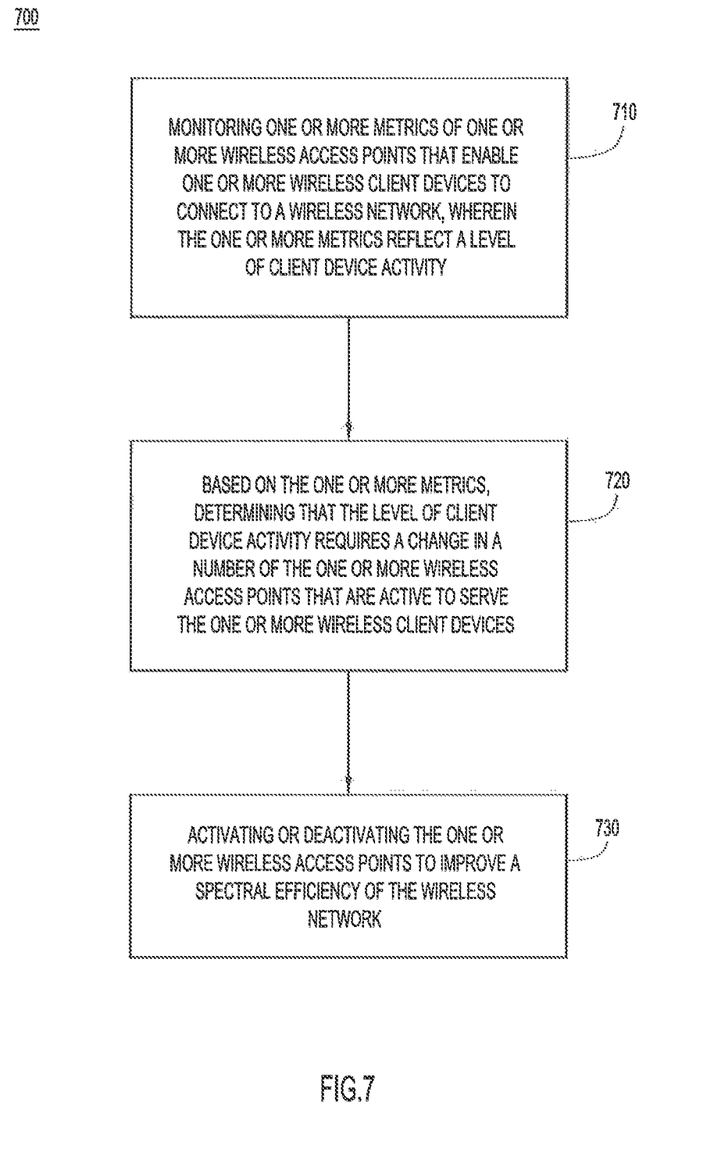
FIG. 7 is a generalized flowchart of a method for activating or deactivating access points based on client activity in accordance with an example embodiment.

FIG. 7 illustrates a flow chart for a method 700 of activating or deactivating wireless access points to improve the spectral efficiency of a wireless network. The flow chart is a generalization of the concepts described above in connection with FIGS. 1-6. At 710, the controller monitors one or more metrics of one or more wireless access points that enable one or more wireless client devices to connect to a wireless network, wherein the one or more metrics reflect a level of client device activity. At 720, based on the one or more metrics, determining that the level of client device activity requires a change in a number of the one or more wireless access points that are active to serve the one or more wireless client devices. At 730, the controller activates or deactivates the one or more wireless access points to improve a spectral efficiency of the wireless network. It will be appreciated that other methods may be used to dynamically optimize spectral efficiency by activating or deactivating radios (APs) based on client RF traffic measurements.

Figure 8:
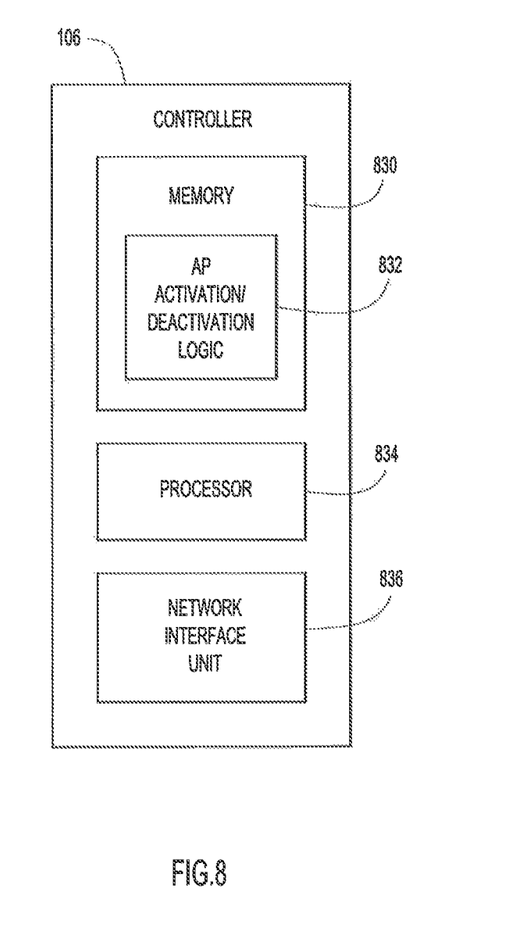
FIG. 8 is a block diagram of the controller shown in FIGS. 1 and 2, in accordance with an example embodiment.

Turning now to FIG. 8 a block diagram is shown for controller 106, which is configured to perform the operations described herein. The controller 106 includes a memory 805, which includes executable software instructions for AP activation/deactivation logic 810, one or more processors 815, and a network interface unit 820 that enables network communications for the controller 106 to communication with APs. The one or more processors 815 are configured to execute instructions stored in the memory 805 (e.g., instructions for the AP activation/deactivation logic 810). When executed by the one or more processors 815, the AP activation/deactivation logic 810 enables the controller 106 to activate and/or deactivate APs in a demand response group(s) based on client activity/demand. The memory 805 may include read only memory (ROM), random access memory (RAM), magnetic disk storage media devices, optical storage media devices, flash memory devices, electrical, optical, or other physical/tangible memory storage devices. Thus, in general, the memory 805 may comprise one or more tangible (non-transitory) computer readable storage media (e.g., a memory device) encoded with software comprising computer executable instructions and when the software is executed (by the processor) it is operable to perform the operations described herein.

As described herein, techniques for providing effective WLAN access to flash crowds may include: (1) continuous measurement of channel efficiency on the active APs in terms of SNIR distributions (e.g., average) across cell and channel-utilization (CU); (2) dynamic activation/deactivation of new APs when channel efficiency reaches a threshold; (3) dynamic adjustment of Wi-Fi channel sizes (e.g., 20 MHz, 40 MHz, 80 MHz, etc.), transmission power, receiver start of packet thresholds, and/or configuration assistants when APs are activated or deactivated, depending on demand; (4) intelligent steering of clients among the grouped APs in the location beyond current optimized roaming (e.g., 802.11k/v) capabilities; and/or (5) dynamic use of AP licenses from a global pool as new APs are activated or deactivated.

There are several advantages to the techniques described herein. First, by adding/removing APs in response to client demand, overall network performance may be optimized by controlling the number and size of collision/contention domains. Additionally, AP licenses may be dynamically managed through a global pool and allocated to places of greatest demand. For example, the AP licenses may be used only when necessary. Also, when APs are added or removed from service, the system may use radio resource management, dynamic channel assignment, and/or dynamic bandwidth selection to model the appropriate channel assignments and sizes. Further, these techniques facilitate better WLAN performance in high-demand areas, thereby optimizing client performance and experience created by enabling only the number of APs that are necessary in a given location at a given time. Clients capable of higher performance may be associated with the appropriate AP. As client demand increases, more APs are enabled on smaller non-overlapping channels, and clients are steered accordingly. This dynamically creates smaller collision/contention domains, thus improving overall WLAN performance for the larger number of client devices. Thus, performance is optimized regardless of the number of associated wireless clients. In addition, these techniques may be applied "in reverse" to ensure that spectral efficiency is maximized as client demand decreases.

In one form, a method is provided. The method comprises: monitoring one or more metrics of one or more wireless access points that enable one or more wireless client devices to connect to a wireless network, wherein the one or more metrics reflect a level of client device activity; based on the one or more metrics, determining that the level of client device activity requires a change in a number of the one or more wireless access points that are active to serve the one or more wireless client devices; and activating or deactivating the one or more wireless access points to improve a spectral efficiency of the wireless network.

In another form, a system is provided. The system comprises: one or more wireless access points that enable one or more wireless client devices to connect to a wireless network; and a controller in communication with the one or more wireless access points, and configured to: monitor one or more metrics of the one or more wireless access points, wherein the one or more metrics reflect a level of client device activity; based on the one or more metrics, determine that the level of client device activity requires a change in a number of the one or more wireless access points that are active to serve the one or more wireless client devices; and activate or deactivate one or more wireless access points to improve a spectral efficiency of the wireless network.

In another form, one or more non-transitory computer readable storage media are provided. The non-transitory computer readable storage media are encoded with instructions that, when executed by a processor, cause the processor to: monitor one or more metrics of one or more wireless access points that enable one or more wireless client devices to connect to a wireless network, wherein the one or more metrics reflect a level of client device activity; based on the one or more metrics, determine that the level of client device activity requires a change in a number of the one or more wireless access points that are active to serve the one or more wireless client devices; and activate or deactivate the one or more wireless access points to improve a spectral efficiency of the wireless network.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:
1. A method comprising:
monitoring one or more metrics of one or more wireless access points that enable one or more wireless client devices to connect to a wireless network, wherein the one or more metrics reflect a level of client device activity;
based on the one or more metrics, determining that the level of client device activity requires a change in a number of the one or more wireless access points that are active to serve the one or more wireless client devices; and
dynamically assigning one or more access point licenses to, or dynamically revoking the one or more access point licenses from, the one or more wireless access points to improve a spectral efficiency of the wireless network, wherein when assigned to the one or more wireless access points, the one or more access point licenses enable the one or more wireless access points to connect the one or more wireless client devices to the wireless network.

2. The method of claim 1, wherein the one or more metrics include one or more of: channel utilization, signal-to-noise-plus-interference ratio distribution, associated client count, or client load.

3. The method of claim 1, further comprising: dynamically load-balancing the one or more wireless client devices across the one or more access points that are active to serve the one or more wireless client devices, modifying channel width, modifying access point power, or adjusting receiver start-of-packet threshold.

4. The method of claim 1, further comprising:

reducing channel widths of channels used by the one or more wireless access points.

5. The method of claim 1, further comprising:
increasing channel widths of channels used by the one or more wireless access points.

6. The method of claim 1, wherein at least one of the one or more wireless access points includes a plurality of radio transceivers configured to operate over respective ones of a plurality of radio channels, the method further comprising:
monitoring one or more metrics indicative of a level of client device activity for each of the plurality of radio transceivers;
determining that the level of client device activity for each of the plurality of radio transceivers requires a change in a number of the plurality of radio transceivers that are active to serve the one or more wireless client devices; and
activating or deactivating one or more of the plurality of radio transceivers of the at least one of the one or more wireless access points to improve the spectral efficiency of the wireless network.

7. The method of claim 1, wherein dynamically assigning or revoking the one or more access point licenses includes temporarily providing the one or more access point licenses from or returning the one or more access point licenses to a global pool stored in a controller in communication with the one or more wireless access points.

8. A system comprising:
one or more wireless access points that enable one or more wireless client devices to connect to a wireless network; and
a controller in communication with the one or more wireless access points, wherein the controller is configured to:
monitor one or more metrics of the one or more wireless access points, wherein the one or more metrics reflect a level of client device activity;
based on the one or more metrics, determine that the level of client device activity requires a change in a number of the one or more wireless access points that are active to serve the one or more wireless client devices; and
dynamically assign one or more access point licenses to, or dynamically revoke the one or more access point licenses from, the one or more wireless access points to improve a spectral efficiency of the wireless network, wherein when assigned to the one or more wireless access points, the one or more access point licenses enable the one or more wireless access points to connect the one or more wireless client devices to the wireless network.

9. The system of claim 8, wherein the one or more metrics include one or more of: channel utilization, signal-to-noise-plus-interference ratio distribution, associated client count, or client load.

10. The system of claim 8, wherein the controller is further configured to: dynamically load-balance the one or more wireless client devices across the one or more access points that are active to serve the one or more wireless client devices, modify channel width, modify access point power, or adjust receiver start-of-packet threshold.

11. The system of claim 8, wherein the controller is further configured to:
reduce channel widths of channels used by the one or more wireless access points.

12. The system of claim 8, wherein the controller is further configured to:
increase channel widths of channels used by the one or more wireless access points.

13. The system of claim 8, wherein at least one of the one or more wireless access points includes a plurality of radio transceivers configured to operate over respective radio channels, and wherein the controller is further configured to:
monitor one or more metrics indicative of a level of client device activity for each of the plurality of radio transceivers;
determine that the level of client device activity for each of the plurality of radio transceivers requires a change in a number of the plurality of radio transceivers that are active to serve the one or more wireless client devices; and
activate or deactivate one or more of the plurality of radio transceivers of the at least one of the one or more wireless access points to improve the spectral efficiency of the wireless network.

14. The system of claim 8, wherein the controller is further configured to:
temporarily provide the one or more access point licenses from or return the one or more access point licenses to a global pool stored in the controller.

15. One or more non-transitory computer readable storage media encoded with instructions that, when executed by a processor, cause the processor to:
monitor one or more metrics of one or more wireless access points that enable one or more wireless client devices to connect to a wireless network, wherein the one or more metrics reflect a level of client device activity;
based on the one or more metrics, determine that the level of client device activity requires a change in a number of the one or more wireless access points that are active to serve the one or more wireless client devices; and
dynamically assign one or more access point license to or dynamically revoke the one or more access point licenses from, the one or more wireless access points to improve a spectral efficiency of the wireless network, wherein when assigned to the one or more wireless access points, the one or more access point licenses enable the one or more wireless access points to connect the one or more wireless client devices to the wireless network.

16. The non-transitory computer readable storage media of claim 15, wherein the instructions further cause the processor to:
reduce channel widths of channels used by the one or more wireless access points.

17. The non-transitory computer readable storage media of claim 15, wherein the instructions further cause the processor to:
increase channel widths of channels used by the one or more wireless access points.

18. The non-transitory computer readable storage media of claim 15, wherein the one or more metrics include one or more of: channel utilization, signal-to-noise-plus-interference ratio distribution, associated client count, or client load.

19. The non-transitory computer readable storage media of claim 15, wherein the instructions further cause the processor to: dynamically load-balance the one or more wireless client devices across the one or more access points that are active to serve the one or more wireless client devices, modify channel width, modify access point power, or adjust receiver start-of-packet threshold.

20. The non-transitory computer readable storage media of claim 15, wherein at least one of the one or more wireless access points includes a plurality of radio transceivers configured to operate over respective radio channels, and wherein the instructions further cause the processor to:
- monitor one or more metrics indicative of a level of client device activity for each of the plurality of radio transceivers;
- determine that the level of client device activity for each of the plurality of radio transceivers requires a change in a number of the plurality of radio transceivers that are active to serve the one or more wireless client devices; and
- activate or deactivate one or more of the plurality of radio transceivers of the at least one of the one or more wireless access points to improve the spectral efficiency of the wireless network.

* * * * *

UNITED STATES PATENT AND TRADEMARK OFFICE
CERTIFICATE OF CORRECTION

PATENT NO. : 10,405,204 B2
APPLICATION NO. : 15/581213
DATED : September 3, 2019
INVENTOR(S) : Michael Alan Kowal et al.

Page 1 of 1

It is certified that error appears in the above-identified patent and that said Letters Patent is hereby corrected as shown below:

In the Claims

Claim 15, Column 14, Line 36, please replace "license to or" with --license to, or--

Signed and Sealed this
Twelfth Day of November, 2019

Andrei Iancu
*Director of the United States Patent and Trademark Office*